July 10, 1973 — A. B. EREKSON — 3,745,081

METHOD FOR MAKING ABSORBENT PADS

Original Filed Nov. 20, 1969 — 2 Sheets-Sheet 1

United States Patent Office 3,745,081
Patented July 10, 1973

3,745,081
METHOD FOR MAKING ABSORBENT PADS
Arthur B. Erekson, Scarsdale, N.Y., assignor to
Borden Inc., New York, N.Y.
Original application Nov. 20, 1969, Ser. No. 878,390, now Patent No. 3,673,019. Divided and this application May 10, 1971, Ser. No. 142,033
Int. Cl. B32b 31/10, 31/18
U.S. Cl. 156—264                                 1 Claim

ABSTRACT OF THE DISCLOSURE

This method is characterized by moving absorbent pad sections on a narrow conveyor so that the side edges of the pad sections extend beyond the conveyor and adhering strips of pressure-sensitive adhesive tape to the sides of the pad sections by means of a rotatable suction roll co-operating with a pressure roll.

CROSS-REFERENCE TO RELATED APPLICATION

This application is a divisional of application Ser. No. 878,390 which was filed on Nov. 20, 1969. Application Ser. No. 878,390 is now U.S. Pat. 3,673,019.

The present invention relates to the method and apparatus for making disposable absorbent pads. Although the present invention may be employed in the manufacture of various forms of disposable absorbent pads such as diapers, incontinent pads, antiseptic bandages, it is particularly suitable for use in the manufacture of the disposable diapers.

A number of attempts have been made to continuously manufacture disposable diapers having affixed thereto a pair of adhesive strips of tape for securnig the diaper edges around the waist of a child and thus eliminate the necessity for buttons, tabs, pins, etc. These attempts have been unsuccessful for the simple reason that no apparatus was available for applying the tape strips to the diapers in a quick, inexpensive and efficient manner.

It is, therefore, an object of this invention to provide a method and apparatus for continuously manufacturing diapers provided with adhesive tape strips.

Another object of the invention is to provide method and apparatus for manufacturing disposable diapers which can be quickly and easily secured to the baby without the use of pins, buttons, metal fasteners, or the like, or the necessity of wetting an adhesive surface, and with little disturbance to the child.

A further object of the invention is the provision of a method and apparatus for producing disposable absorbent pads in an economical, and an efficient manner.

The method and apparatus will now be described in conjunction with the attached drawings wherein.

Figure 1:
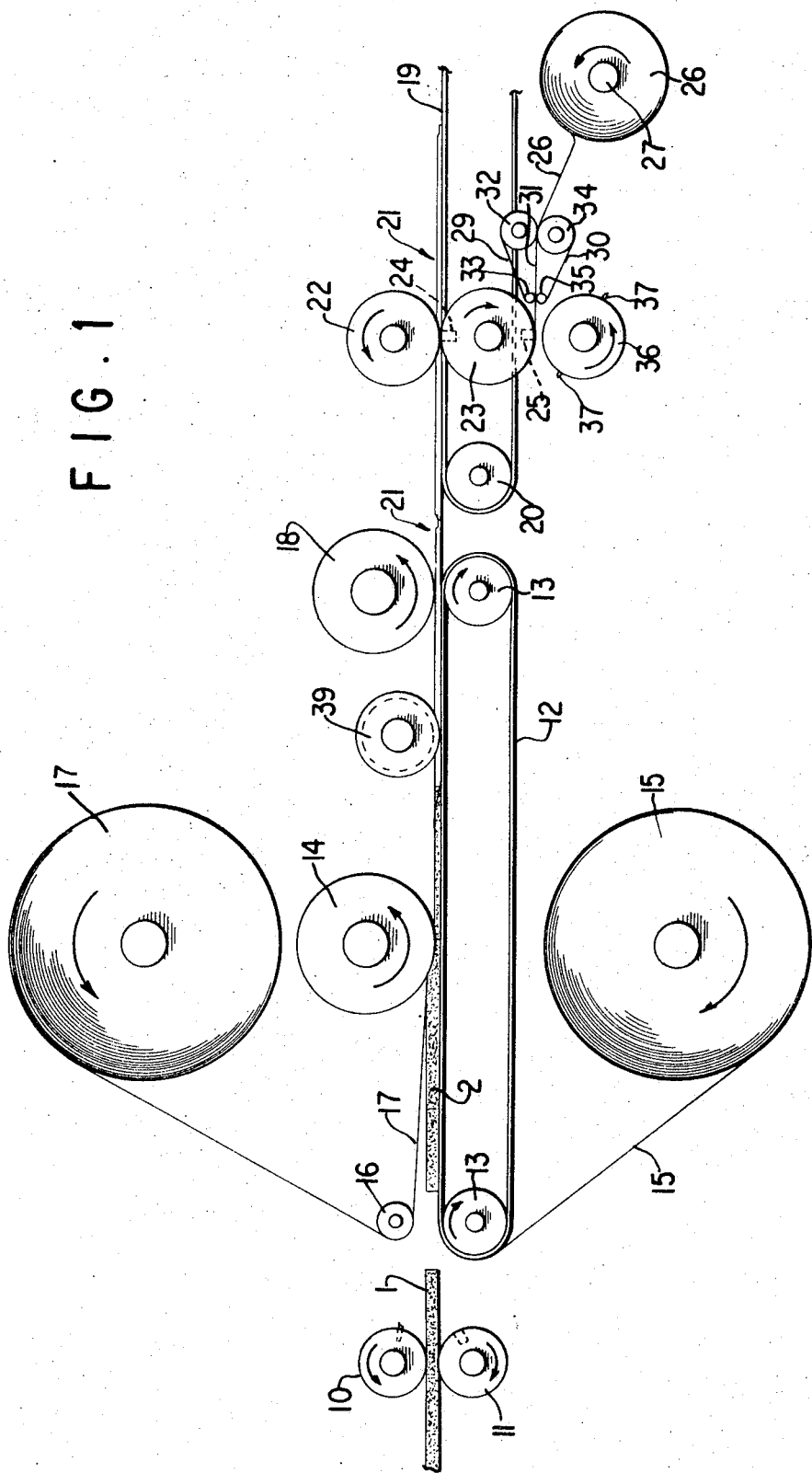
FIG. 1 is a side view of the apparatus showing manufacture of the diapers and affixation of the adhesive tape srtips.

Referring to FIG. 1, a ribbon of absorbent shredded pulp 1, or a material of similar characteristics, is moved axially between a pair of conventional roller cutters 10, 11 whereby it is severed into separate pad sections 2. A reel of plastic film 15, such as polyethylene, is mounted for rotation below conveyor belt 12 and a reel of paper 17 is mounted above conveyor belt 12. Conveyor belt 12 is draped over rolls 13 and functions to continuously move the diaper ribbon assembly. The pad sections are aligned with a mouth formed by plastic film 15 running over the conveyor belt 12 and the continuous sheet of paper 17 extending over guide roller 16 and under hold-down roll 14. The pad sections are forced into the mouth created by plastic film 15 and paper 17 whereby it is enveloped in plastic film on the underside and paper on the upper surface.

Dimensionally, the pad sections, which are centered between paper and film, are of a lesser width than the film or paper and are generally substantially less than the width thereof, while the film and paper are of equal width. Specifically, the paper is somewhat wider than the film to accommodate the thickness of the pad.

Figure 2:
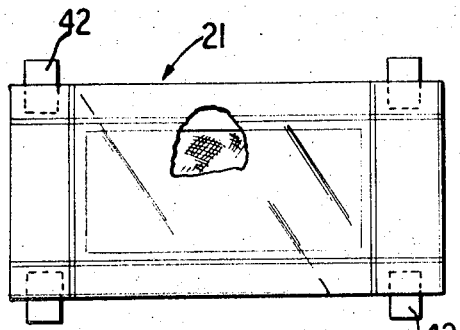
FIG. 2 is a top view of a diaper showing the adhesive tape strips and the sealing lines imparted by the corresponding rolls.

The three-layer diaper ribbon assembly of plastic film, absorbent shredded pulp pad and paper is advanced linerly along conveyor belt 12 and under hold-down roll 14. Roll 14 is of a conventional type—being centrally indented but otherwise provided with a smooth outer surface serving to applying pressure and thus to compact or compress the diaper ribbon assembly and to form the paper over the pad. The three-layer diaper ribbon assembly is then further moved past rolls 39 and 18 where it is subjected to treatment to define and to contain the pad sections. More specifically, roll 39 is provided with spaced, circumferentially upraised, narrow heated strips to produce adhesion of film and paper upon contact and application of pressure. In this instance, the circumferentially upraised strips are arranged on the roll in a manner to produce four continuous sealing lines on the diaper ribbon assembly, as shown in FIG. 2. Two inner sealing lines are provided to contain the pad sections and prevent them from shifting, while the outer sealing lines are made in order to heat-seal the edges of plastic film and paper.

Roll 18 has four protruding heated bars on its surface disposed transversely with respect to the longitudinal axis of conveyor belt 12. These bars have blunt edges and function to cause fusion of plastic film and paper on contact to define the transverse sealing lines.

Figure 4:
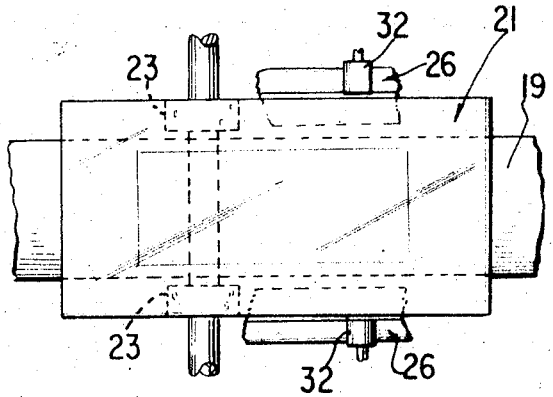
FIG. 4 is a top view showing structural arrangement of a conveyor belt, a diaper and vacuum drums.
Figure 3:
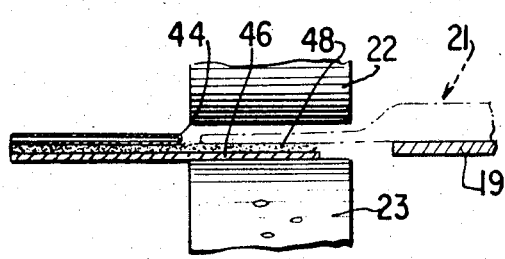
FIG. 3 is a cross-sectional view of one variant of an adhesive tape strip which is secured to the opposite edges of the diaper by a pair of cooperating rolls.

The affixation of the narrow-width adhesive strips 42, as shown in FIG. 3, having removable liner 44, to the longitudinal edges of each diaper 21 is effected by roller 23 having diametrically opposed vacuum valves 24 and 25 on its circumferential face. As is evident from FIG. 4, side edges of diaper 21 overlap belt conveyor 19. Rollers 23 are positioned below the overlapping edges of the diaper with a portion of their surface underlying the overlapping edges of the diaper in order to secure a strip of the adhesive tape to the underside of the overlapping edges of the diaper in conjunction with cooperating pressure rolls 22. Adhesive tape strips 42 are strips of conventional adhesive tape with the removable liner completely removed from the portion of the strip which is secured to the diaper. The removable liner 44 is folded on itself to provide a tab for stripping it from the strip of adhesive tape. These adhesive tape strips are used by the baby attendant to secure the diaper about infant's waist.

A reel of pressure-sensitive tape 26 is mounted for rotation on shaft 27. The tape, with one-half of the sticky side exposed and facing downwardly, is advanced in the interface 31 defined by metering belts 29, 30 entrained over rollers 32, 33 and 34, 35. Identical arrangement is provided on the opposite side of the conveyor belt 19. Roll 36, which is provided with diametrically-opposed cutting blades 37, is disposed in parallel relationship to roll 23 and severs the tape ribbon intermittently as it is extended by belts 29, 30 against roll 23. To avoid fouling of the belts with adhesive tape, liner 44, one half of it being folded on itself, is provided on a portion of the adhesive tape strip 42 leaving a strip of the sticky face 48 thereof exposed, as plainly illustrated in FIG. 3. Rollers 32, 33, and 34, 35 are of a smaller axial extent than roll 23 and are off-set therefrom to allow belts 29 and 30 to come in contact only with the folded removable liner 44 and not with the sticky exposed face 48 of the strip of adhesive tape.

In operation, rotation of roll 23 is in timed relation to the linear movement of belt 19 and synchronized with rotation of roll 36. Ribbon of adhesive tape 26 is fed to measuring belts 29 and 30, which present the tape ribbon to roll 36 for sequential severing into strips of predetermined width.

As roll 36 rotates, blades 37 sever the ribbon of adhesive tape 26 into narrow strips 42. Each of the tape strips 42 is drawn against either of the vacuum valves 24 or 25 and the sticky portion thereof is presented against underside of the overlapping portion of diaper 21. Tape strip 42 is affixed to the underside of the overlapping portion of the diaper by means of pressure created by cooperating rolls 22 and 23. The liner may be easily removed by the baby attendant by simply pulling on the folded strip of removable liner 44. Identical components provided on the opposite side of conveyor belt 19 operate in identical fashion to affix another tape strip 42 to the opposite side of diaper 21.

The apparatus, and modifications thereof, described herein is adaptable to continuous or intermittent operation. If the apparatus were to be operated intermittently, then additional components such as timing devices and breaking means, would have to be installed.

Figure 5:
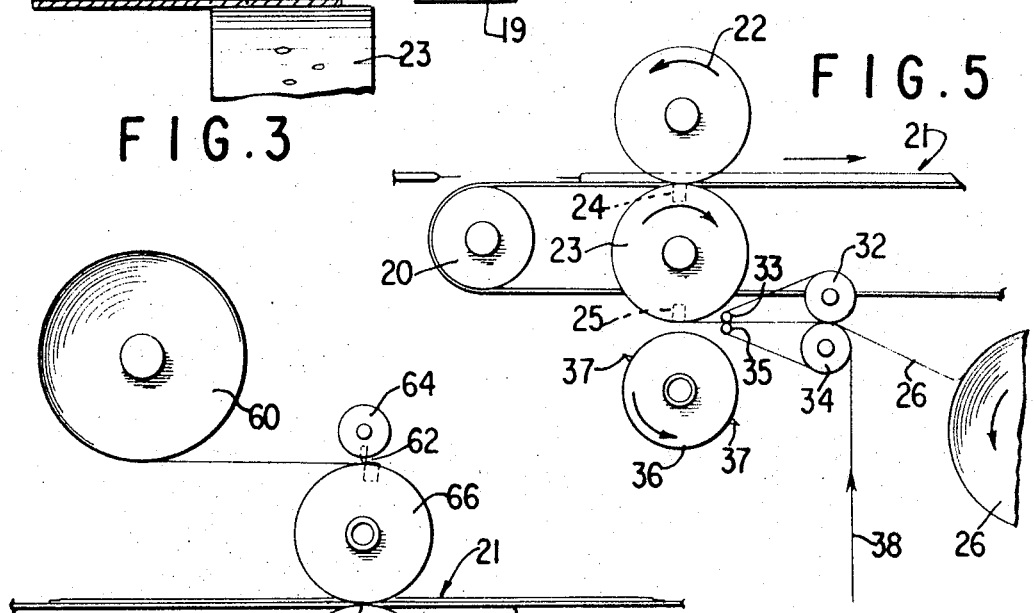
FIG. 5 is a modification of the apparatus depicted in FIG. 1 relating to affixation of the adhesive tape strips to diapers.

In a modification illustrated in FIG. 5, a reel of adhesive tape 26 is provided without any removable liner at all. As shown in FIGS. 5, the adhesive tape is advanced between cooperating measuring belts 29, 30, with its sticky side facing downwardly. To prevent fouling of the belts with the adhesive tape, removable liner 38 is brought against the sticky side of adhesive tape 26 in order to cover the portion of the adhesive tape which comes into contact with the measuring belts 29, 30. Subsequent operations are identical to the embodiment described above. In this manner, a strip of adhesive tape, with a removable liner, can be applied at opposite edges and at the upper portions of a diaper.

Figure 6:
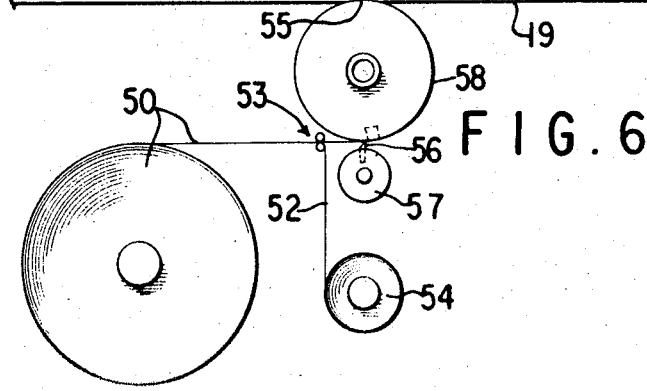
FIG. 6 is another embodiment of the apparatus for affixing adhesive tape strips to diapers.

Another embodiment of the method and apparatus for applying strips of adhesive tape to diapers, and absorbing pads in general, is shown in FIG. 6. A reel of adhesive tape 50 is disposed below belt conveyor 19. This tape may be provided with or without removable liner 52. If adhesive tape 50 is provided with liner 52, the liner is stripped-off by passing the tape through metering rolls 53 and winding the liner on reel 54. A narrow strip 55 of tape 50 is then severed by blade 56 mounted on a rotatable cylinder 57 and picked-up by vacuum drum 58. The vacuum drum affixes a portion of the strip 55 to the underside of the overlapping edge of diaper 21, with a portion of the sticky face of strip 55 remaining exposed. As in previously described embodiments, the exposed sticky face of tape 50 is provided with a removable liner. This operation is accomplished by positioning a reel of the removable liner ribbon 60 above the conveyor belt 19 and advancing it against blade 62 mounted on rotatable cylinder 64. A strip of liner ribbon 60 is cut by blade 62 and picked up by vacuum drum 66 which applies the strip to the exposed sticky portion of adhesive tape strip 55. Removable liner 60 may be ordinary backing paper, one half of which may be folded on itself, as is liner 44 shown in FIG. 3.

Any number of adhesive strips may be applied to an absorbent pad depending on the type of absorbent pad that is being manufactured. Although four adhesive strips are shown in FIG. 2, it should be understood that a diaper requires only two at one end.

For the sake of illustration, the apparatus herein described may be designed to manufacture adult incontinent pads at the rate of 80 per minute, and diaper pads at the rate of 165 per minute. The incontinent pad may have overall dimensions of 25" x 35" with a centrally located cellulose wadding having dimensions of 5" x 26". With respect to the diaper pad, the overall dimensions are 12½" x 17", with the centrally disposed absorbent pad measuring 5½" x 13".

After application of the adhesive strips to the diaper ribbon assembly, or any other disposable pad, the diaper ribbon assembly is advanced to another station where the ribbon is severed into individual diapers which are stacked and packaged.

What is claimed:

1. Method for producing diapers with adhesive tape fastening means, which method comprises the steps of:
    advancing a first ribbon of absorbent shredded pulp and severing said first ribbon, while advancing, into separate pad sections;
    simultaneously advancing a second ribbon of plastic film below said pad sections and a third ribbon of paper above said pad sections;
    aligning said pad sections with the mouth formed by plastic film and paper, whereby each successive pad section is enveloped in plastic film on the underside and paper on the upper surface, the pad sections being centered between paper and film and being of a lesser width than the film or paper, the paper being somewhat wider than the film to accommodate the thickness of the pad;
    advancing the three layer diaper ribbon assembly under a hold-down roll to compact the assembly and to form the paper over the pad, and thereafter under a roll provided with spaced circumferentially upraised narrower heated strips to produce adhesion of film nad paper upon contact and application of pressure;
    advancing the assembly further to at least one tape affixing station on each side, over a conveyor means which is narrower than the diapers, thus permitting the side edges of the diapers to overlap the conveyor means;
    simultaneously advancing toward each said station via a cutting means a ribbon of conventional adhesive tape having removable liner completely removed from that portion of said strip which is to be secured to the diaper and having removable liner folded back on itself on the remaining portion of the strip to provide a tab for later removal;
    cutting said tape into strips of adhesive tape;
    transferring a strip of tape for affixation of a portion of the adhesive surface of the tape to a side edge of the diaper, the remaining portion of the tape overhanging the side edge of the diaper, presenting the strip against an edge of the diaper and affixing a portion of the strip to the diaper by means of applied pressure; said affixing being synchronized to position adhesive tapes suitably for later securing the diaper edges around a child's waist; and
    severing the ribbon assembly into individual diaper stacking and packaging.

References Cited

UNITED STATES PATENTS 2,948,328  8/1960  Coventry _____ 156—264
2,990,081  6/1961  De Neui et al. _____ 156—519

JACOB H. STEINBERG, Primary Eaxminer

U.S. Cl. X.R.

156—521